(12) United States Patent
Kwon

(10) Patent No.: US 11,918,096 B2
(45) Date of Patent: Mar. 5, 2024

(54) COLOR CHANGE MODULE USING REFLECTIVE DISPLAY, AND INDEPENDENT TYPE COLOR CHANGE CONTROL APPARATUS

(71) Applicant: KOREA ELECTRONICS TECHNOLOGY INSTITUTE, Seongnam-si (KR)

(72) Inventor: Soon Hyung Kwon, Seongnam-si (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 438 days.

(21) Appl. No.: 17/169,991

(22) Filed: Feb. 8, 2021

(65) Prior Publication Data

US 2021/0251365 A1    Aug. 19, 2021

(30) Foreign Application Priority Data

Feb. 13, 2020 (KR) .................. 10-2020-0017835

(51) Int. Cl.
| | | |
|---|---|---|
| *A45D 31/00* | (2006.01) | |
| *G02F 1/1335* | (2006.01) | |
| *G02F 1/167* | (2019.01) | |
| *G09F 19/20* | (2006.01) | |

(52) U.S. Cl.
CPC ....... *A45D 31/00* (2013.01); *G02F 1/133557* (2021.01); *G02F 1/167* (2013.01); *G09F 19/20* (2013.01)

(58) Field of Classification Search
CPC ................ G02F 1/167; G09F 19/20
See application file for complete search history.

(56) References Cited

U.S. PATENT DOCUMENTS 8,176,924 B2 *   5/2012   Schneider ............ C09K 19/544
                                                     349/115

FOREIGN PATENT DOCUMENTS

KR    10-2009-0099251 A     9/2009

\* cited by examiner

*Primary Examiner* — Dung T Nguyen
(74) *Attorney, Agent, or Firm* — Knobbe, Martens, Olson & Bear, LLP

(57) ABSTRACT

Provided are a color change module using a reflective display, and an independent type color change control apparatus providing an electrical signal for changing a color of the color change module. The color change module can include a module base, the reflective display, a first external electrode and a second external electrode. The module base has a shape corresponding to an object for attachment. The reflective display is provided on an upper surface of the module base, and displays information in a manner wherein light coming from outside is reflected. The first external electrode and the second external electrode are provided to be connected to the reflective display and to be exposed to outside for receiving the information to be displayed on the reflective display from the independent type color change control apparatus.

13 Claims, 7 Drawing Sheets

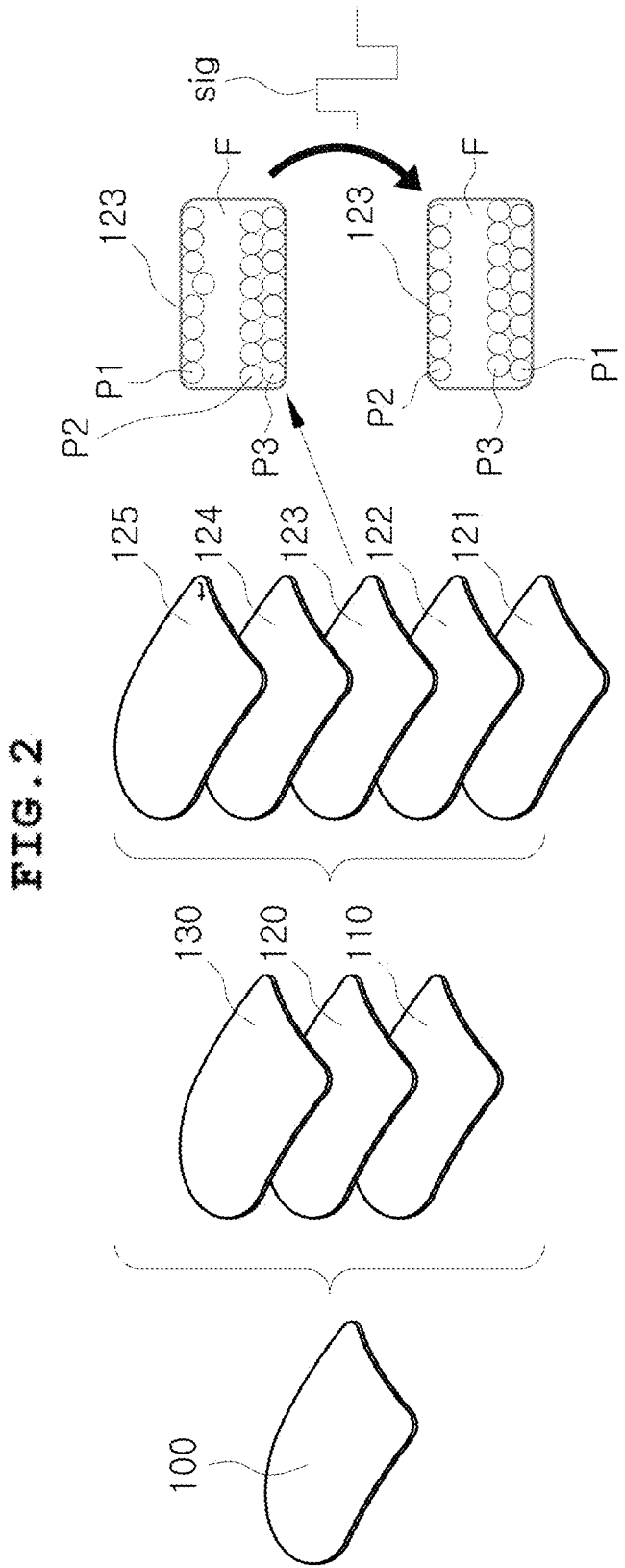

COLOR CHANGE MODULE USING REFLECTIVE DISPLAY, AND INDEPENDENT TYPE COLOR CHANGE CONTROL APPARATUS

CROSS REFERENCE TO RELATED APPLICATION

The present application claims priority to Korean Patent Application No. 10-2020-0017835, filed Feb. 13, 2020, the entire contents of which is incorporated herein for all purposes by this reference.

BACKGROUND OF THE INVENTION

Field of the Invention

The present disclosure relates to a color change module using a reflective display, and an independent type color change control apparatus.

Description of the Related Art

There is nail art for hand and foot beauty by painting on fingernails and toenails, by attaching stickers or artificial nails with glue, or by applying and hardening nail gel to create artificial nails. Results of nail art are artificial nails fixed on fingernails or paintings directly painted on fingernails, so the colors or paintings are unable to be changed. Therefore, there is a problem that it is inconvenient and greatly wasteful to remove the artificial nails and attach other artificial nails, and so on for changing to other designs.

In addition, various types of interior accessories, such as tables, desks, wallpaper, etc. display only the colors determined when manufactured. Therefore, in order to change an interior, it is necessary to change furniture or re-paper rooms, which is costly and greatly wasteful.

In the meantime, a reflective display is a display device called electronic paper or an electrophoresis display. The reflective display displays images by applying an electric field, etc., to cells constituting pixels causing a change in the arrangement of particles inside the cells. The reflective display requires electric energy only when changing images, and the images resulting from the change are displayed by reflection of light coming from outside, which consumes less power.

The foregoing is intended merely to aid in the understanding of the background of the present disclosure, and is not intended to mean that the present disclosure falls within the purview of the related art that is already known to those skilled in the art.

Document of Related Art (Patent Document 1) KR 10-2009-0099251 A.

SUMMARY OF THE INVENTION

The present disclosure is directed to providing a color change module capable of changing a color by using a reflective display, and providing a color change control apparatus for controlling a color of the color change module, the color change control apparatus being independent of the color change module.

According to an embodiment of the present disclosure, there is provided a color change module using a reflective display, the color change module including: a module base having a shape corresponding to an object for attachment; the reflective display provided on an upper surface of the module base, and displaying information in a manner wherein light coming from outside is reflected; and a first external electrode and a second external electrode provided to be connected to the reflective display and to be exposed to outside, and receiving the information to be displayed on the reflective display from an external apparatus.

In addition, according to an embodiment of the present disclosure, the color change module using the reflective display may further include a decorative layer provided on the reflective display, and including at least one among a color, a design, a character, glitter, cubic zirconia, a jewel, and gloss.

In addition, the reflective display may include: a base substrate made of a flexible material; a lower electrode provided on the base substrate and connected to the first external electrode; a cell containing multiple particles that are charged with different polarities and differ in quantity of electric charge or in size; an upper electrode provided on the cell and connected to the second external electrode; and a protective layer provided on the upper electrode and made of a transparent material.

In addition, the module base may be provided in the shape corresponding to a person's fingernail, and the first external electrode and the second external electrode may be provided in a lower surface of the module base and may be provided to be parallel to each other and to be long in a direction from a fingernail origin part to a fingernail distal part.

In addition, the module base may be provided in the shape corresponding to a person's fingernail, and a plurality of the cells of the reflective display may be provided in multiple sections respectively for cutting along cutting lines that correspond to a curve of a fingernail distal part, and the first external electrode and the second external electrode may be provided in a lower surface of the module base and may be provided to be parallel to each other and to be long in a direction from a fingernail origin part to the fingernail distal part.

In addition, the module base may be provided in a pattern that completely fills a 2D plane, and the first external electrode and the second external electrode may be provided to be exposed to a protective layer of the reflective display and may be provided to be in contact with a first external electrode and a second external electrode of a color change module positioned nearby, respectively.

In addition, the first external electrode and the second external electrode may be provided to be in contact with the first external electrode and the second external electrode of the color change module positioned nearby, respectively, and may be provided not to be exposed to the protective layer of the reflective display.

According to an embodiment of the present disclosure, there is provided an independent type color change control apparatus for controlling color change of the color change module using the reflective display of claim 1, the independent type color change control apparatus including: a control unit providing an electrical signal required to change a color that the color change module displays; and a connection unit connected to the color change module to transmit the electrical signal to an external electrode of the color change module, wherein the color change module may include: a module base having a shape corresponding to an object for attachment; the reflective display provided on an upper surface of the module base, and displaying information in a manner wherein light coming from outside is reflected; and the external electrode including a first external electrode and a second external electrode provided to be connected to the reflective display and to be exposed to outside, the first external electrode and the second external electrode receiving the information to be displayed on the reflective display from the independent type color change control apparatus.

In addition, the connection unit may include: a first contact electrode being in contact with the first external electrode to transmit the electrical signal from the control unit; a second contact electrode being in contact with the second external electrode to transmit the electrical signal from the control unit; and a guide making the first contact electrode and the second contact electrode to be in physical contact with the first external electrode and the second external electrode respectively.

In addition, the guide may include: a lower guide provided to correspond to a shape of a person's fingernail, and provided with an upper surface in which the first contact electrode and the second contact electrode are provided; and an upper guide provided to corresponding to a shape of the lower guide, and applying pressure to the color change module in a direction of the lower guide for physical contact between the first and the second external electrode and the first and the second contact electrode.

The features and advantages of the present disclosure will be more clearly understood from the following detailed description based on the accompanying drawings.

The terms and words used in the present specification and claims should not be interpreted as being limited to typical meanings and dictionary definitions, but should be interpreted as having meanings and concepts relevant to the technical scope of the present disclosure based on the rule according to which an inventor can appropriately define the concept of the term to describe most appropriately the best method he or she knows for carrying out the present disclosure.

According to the embodiments of the present disclosure, as the color change module using the reflective display is applied to artificial nails, decoration tiles, and furniture surfaces, the color of the color change module can be changed when the user wants, and the color change control apparatus manufactured to be independent is used to control the color of the color change module, so that the color change module can be manufactured to be light, thin, short, and small and the price can be reduced.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 2 is an exploded perspective view of a color change module using a reflective display, which is applied to an artificial nail according to an embodiment of the present disclosure;

DETAILED DESCRIPTION OF THE INVENTION

Figure 1:
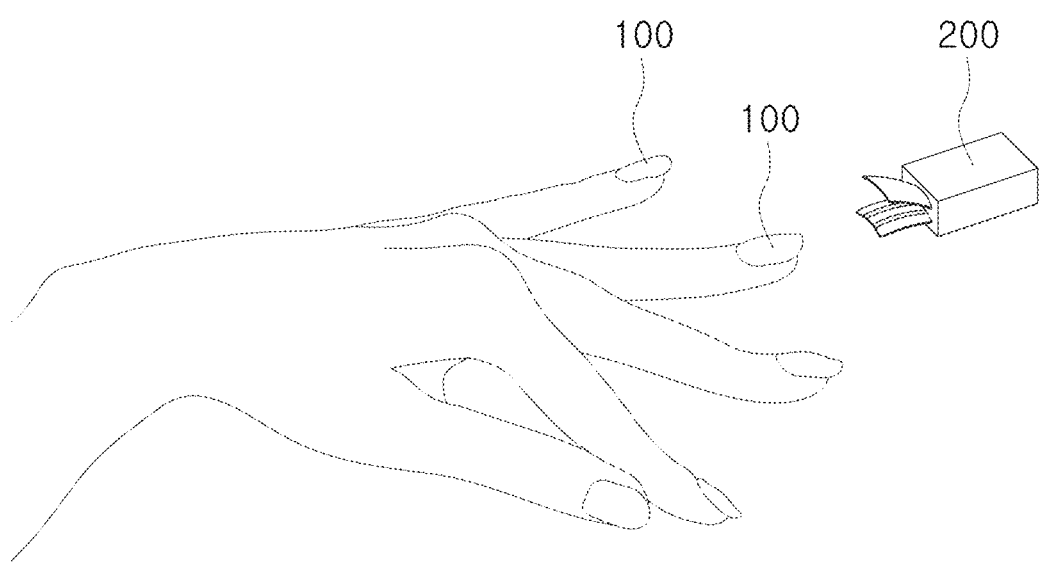
FIG. 1 is a diagram illustrating a color change module using a reflective display, and a color change control apparatus, which are applied to artificial nails according to an embodiment of the present disclosure.

The objectives, features and advantages of the present disclosure will be more clearly understood from the following detailed description of the preferred embodiments associated with the accompanying drawings. As for reference numerals associated with elements in the drawings, the same reference numerals will refer to the same or like elements throughout the drawings. Further, the terms "one side", "another side", "first", "second", and the like are used to distinguish one element from other elements, but the elements should not be construed to be limited by the terms. Hereinbelow, in the description, details of well-known features and techniques may be omitted to avoid unnecessarily obscuring the presented embodiments.

Hereinafter, preferred embodiments of the present disclosure will be described in detail with reference to the accompanying drawings.

According to an embodiment of the present disclosure, a color change module 100 using a reflective display may include a module base 110, the reflective display 120, and a first external electrode 141 and a second external electrode 142. The module base 110 has a shape corresponding to an object for attachment. The reflective display 120 is formed on an upper surface of the module base 110, and displays information in a manner wherein light coming from outside is reflected. The first external electrode 141 and the second external electrode 142 are formed to be connected to the reflective display 120 and to be exposed to outside, and receive information to be displayed on the reflective display 120 from an external apparatus. In the present specification, the color change module 100 using the reflective display may be simply called the "color change module 100", and an independent type color change control apparatus 200 may be simply called a "color change control apparatus 200".

The module base 110 may be formed in a shape corresponding to an object for attachment. In a case in which the color change module 100 is manufactured as an artificial nail to be attached to a person's fingernail, the module base 110 may be formed in a size, curvature, length, and shape corresponding to the shape of a fingernail. In a case in which the color change module 100 is manufactured as an interior tile to be attached to a wall surface or a furniture surface, the module base 110 may be formed in a shape that repeats to fill a 2D plane and is attachable.

The reflective display 120 is formed on the module base 110, and light coming from outside reflects off particles P moved inside a cell 123, so that information, such as colors, a character, etc., is visually displayed.

An external electrode 140 receives an electrical signal Sig from the external apparatus (color change control apparatus 200) and transmits the same to the reflective display 120.

The electrical signal Sig that the external electrode 140 transmits to the reflective display 120 is to form an electric field in the cell 123.

FIG. 1 is a diagram illustrating a color change module 100 using a reflective display, and a color change control apparatus 200, which are applied to artificial nails according to an embodiment of the present disclosure. FIG. 2 is an exploded perspective view of a color change module 100 using a reflective display, which is applied to an artificial nail according to an embodiment of the present disclosure.

As shown in FIGS. 1 and 2, according to an embodiment of the present disclosure, the color change module 100 that is applied to artificial nails is formed in a shape substantially corresponding to a person's fingernail and is used as an artificial nail. Each color change module 100 may be attached to a fingernail. The color change control apparatus 200 is a stand-alone apparatus that is to physically separated from the color change module 100. When a user wants to change the color displayed on the color change module 100, the user connects the color change module 100 with the color change control apparatus 200 and the color of the color change module 100 is changed according to an electrical signal Sig that the color change control apparatus 200 provides to the color change module 100. The color change module 100 uses the reflective display 120. Thus, after the color of the reflective display 120 is changed according to an electrical signal Sig that the color change control apparatus 200 provides, even when the color change control apparatus 200 is disconnected from the color change module 100, the color change module 100 is capable of keeping the color resulting from the change.

The reflective display 120 may be formed on the module base 110. The reflective display 120 is made of a substantially flexible material, so the reflective display 120 is able to operate even when the module base 110 is in a curved shape.

The reflective display 120 may include: a base substrate 121 made of a flexible material; a lower electrode 122 formed on the base substrate 121 and connected to the first external electrode 141; the cell 123 containing multiple particles P that are charged with different polarities and differ in quantity of electric charge or in size; an upper electrode 124 formed on the cell 123 and connected to the second external electrode 142; and a protective layer 125 formed on the upper electrode 124 and made of a transparent material.

The base substrate 121 is invisible to outside of the reflective display and may not be transparent. The protective layer 125 is a layer visible to outside, and is made of a transparent material, so that light coming from outside reflects off the cell 123 for display to outside. The base substrate 121 and the protective layer 125 may be made of a flexible material so that the color change apparatus is in close contact with a surface of an object. The protective layer 125 is formed on the upper electrode 124, so that the reflective display 120 is protected from external physical and chemical causes.

The lower electrode 122 and the upper electrode 124 apply an electric field to the cell 123 to control the color of the cell 123. The lower electrode 122 is formed on the base substrate 121 and the upper electrode 124 is formed on the cell 123. The upper electrode 124 may be made of a transparent and flexible material. The lower electrode 122 may be made of a flexible and transparent material or a flexible and opaque material. The lower electrode 122 and the upper electrode 124 may operate in a passive matrix (PM) method, an active matrix (AM) method, or a segment method.

The cell 123 may contain a fluid F and the multiple particles P therein. The fluid F is electrically neutral. The particles P may include first particles P1 having a negative electric charge (−) and second particles P2 having a positive electric charge (+). The particles P may include first particles P1 (++) and second particles P2(+) that have electric charges of which the polarities are the same, but the sizes differ. The particles P may include first particles P1 and second particles P2 that have different sizes. The particles P may include particles P in different colors, such as red (R) particles P1, green (G) particles P2, blue (B) particles P3, etc. The multiple particles P may include various types of particles Pin which different polarities of electric charges, different sizes of electric charges, different sizes of the particles P, and different colors are combined.

A voltage is applied to the lower electrode 122 and the upper electrode 124 to form an electric field, and according to the direction of the electric field, the particles P inside the cell 123 may be moved up or down in the cell 123. When particular particles P present inside the cell 123 are moved up in the cell 123 by adjusting the intensity and the direction of the electric field, light coming from outside to the cell 123 reflects off the particles P and the colors of the particles P are displayed to outside.

According to an embodiment of the present disclosure, the color change module 100 using the reflective display may further include a decorative layer 130 formed on the reflective display 120 and including at least one among a color, a design, a character, glitter, cubic zirconia, a jewel, and gloss.

The decorative layer 130 may improve aesthetic appeal in the case in which the color change module 100 is applied to decorative products, such as artificial nails, interior tiles, etc., and may protect the reflective display 120 from physical or chemical impacts. The decorative layer 130 is formed in different colors and is made of a substantially transparent material so that light passes through. The decorative layer 130 may include a decorative design, such as a floral design, a star design, etc., or a character, such as Hangul letters or other alphabetic letters. The decorative layer 130 may include glitter composed of small power that reflects light and glitters, or may include cubic zirconia, a jewel, etc. The decorative layer 130 may be formed to have gloss on the surface thereof.

The external electrode 140 may include the first external electrode 141 and the second external electrode 142 that are electrically separated from each other. The external electrode 140 is formed to be exposed to the outside of the color change module 100 so as to receive an electrical signal Sig from outside and to transmit the same to the reflective display 120. The first external electrode 141 may be connected to the lower electrode 122 of the reflective display 120. The second external electrode 142 may be connected to the upper electrode 124 of the reflective display 120.

The particles P contained in the cell 123 may move inside the cell 123 according to the direction, intensity, and duration of the electric field that the lower electrode 122 and the upper electrode 124 form. The lower electrode 122 and the upper electrode 124 may form the electric field according to an electrical signal Sig input from the external electrode 140. As the electric field that the lower electrode 122 and the upper electrode 124 form is applied to the cell 123, the particles P inside the cell 123 move and the particles at the higher position in the cell 123 are changed from the particles P1 to the particles P2, and the color of the particles P at the higher position in the cell 123 is recognized from outside, thereby changing the color. The electrical signal Sig is transmitted through the first external electrode 141 and the second external electrode 142. For example, when the second external electrode 142 is at ground level (0 V), a signal is applied in such a manner that the first external electrode 141 lasts at positive (+) 1 V for X seconds and lasts at negative (−) 2 V for Y seconds. The detailed waveform of the electrical signal Sig may vary depending on the polarity, quantity of electric charge, and size of the particles P contained in the cell 123, and on the color to be displayed on the reflective display 120.

Figure 3A:
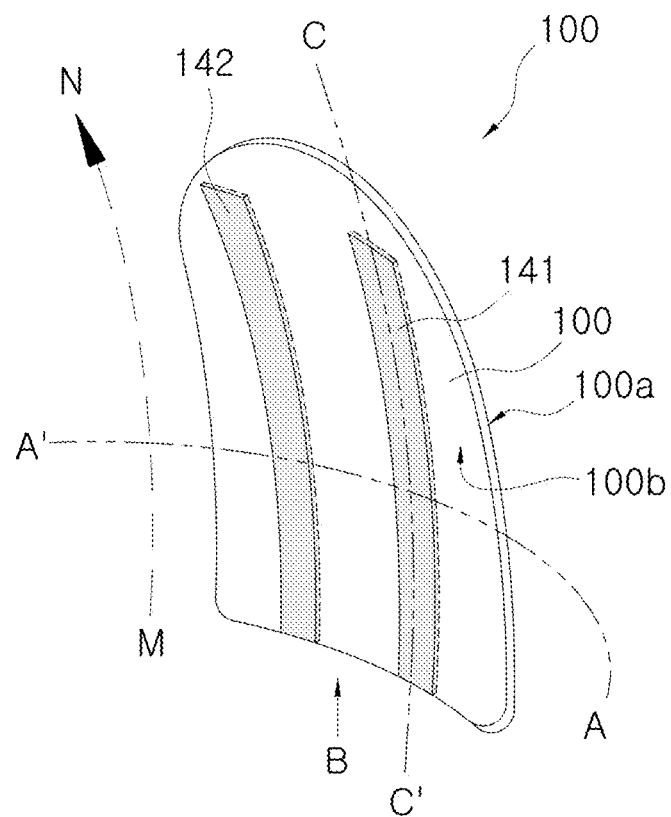
FIGS. 3A to 3D are diagrams illustrating an external electrode of a color change module using a reflective display, which is applied to an artificial nail according to an embodiment of the present disclosure.
Figure 3B:
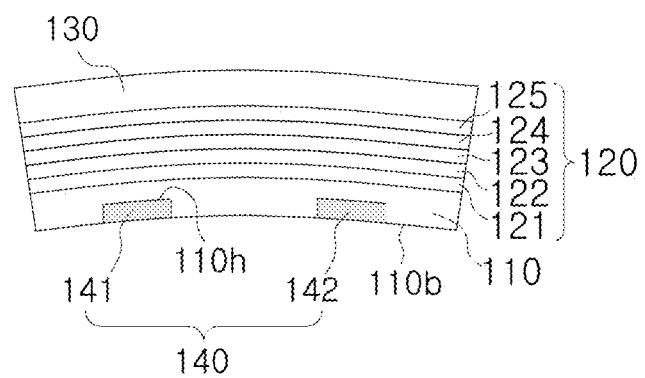
Figure 3C:
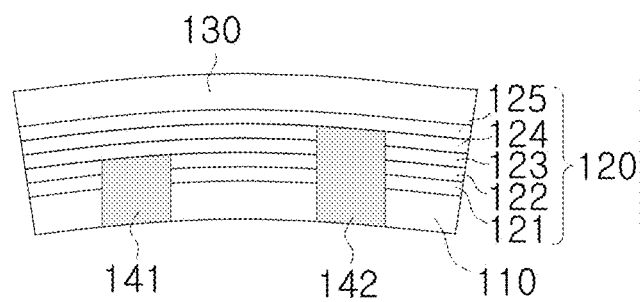
Figure 3D:
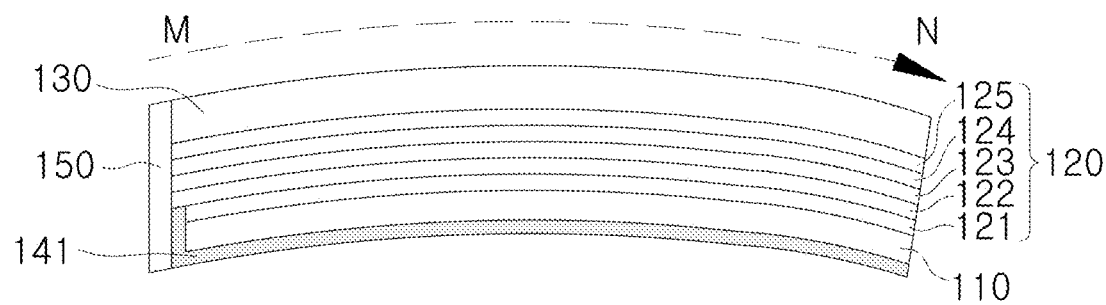

FIGS. 3A to 3D are diagrams illustrating an external electrode 140 of a color change module 100 using a reflective display, which is applied to an artificial nail according to an embodiment of the present disclosure. FIG. 3A is a perspective view of a rear surface of the color change module 100. FIG. 3B is a cross-sectional view taken along line A-A' of FIG. 3A. FIG. 3C is a side view when viewing the color change module 100 in a direction of an arrow B shown in FIG. 3A. FIG. 3D is a cross-sectional view taken along line C-C' of FIG. 3A.

As shown in FIG. 3A, in the color change module 100 that is applied to an artificial nail, the module base 110 is formed in a shape corresponding to a person's fingernail. In addition, the first external electrode 141 and the second external electrode 142 are formed in the lower surface of the module base 110 and are formed to be parallel to each other and to be long in the direction from a fingernail origin part M to a fingernail distal part N. A person's fingernail grows in the direction from the origin part M, which corresponds to the visible beginning part of the fingernail, to the distal part N, which corresponds to the end of the fingernail. The color change module 100 that is applied to an artificial nail has a lower surface that is to be attached to a person's fingernail and an upper surface that is visible to outside. The upper surface is formed to be substantially convex and the lower surface is formed to be substantially concave.

As shown in FIGS. 3B and 3D, the module base 110 is provided with a groove 110h that is concave inward at a part in which the external electrode 140 is to be formed, and the external electrode 140 is formed in the groove. The external electrode 140 is formed in the groove formed in the lower surface of the module base 110 such that the surface in which the external electrode 140 is exposed and the lower surface of the module base 110 are present on the same plane. The smoothness of the lower surface of the module base 110 enables the color change module 100 to be easily attached to a person's fingernail.

The external electrode 140 of the color change module 100 that is applied to an artificial nail is positioned at the bottom of the module base 110 and has a part formed in a direction perpendicular to the surface of the module base 110 of the color change module (100) in order to be connected to the upper electrode 124 or the lower electrode 122 of the reflective display 120. There may be various structures connecting the first external electrode 141 to the lower electrode 122 and connecting the second external electrode 142 to the upper electrode 124. Specifically, the first external electrode 141 may extend through a via hole formed in the module base 110 and the base substrate 121 and may be connected to the lower electrode 122. The second external electrode 142 may extend through a via hole formed in the module base 110, the base substrate 121, the lower electrode 122, and the cell 123 and may be connected to the upper electrode 124. In this case, the via holes may be positioned as close as possible to the edge of the color change module 100 so as not to penetrate the cell 123.

Alternatively, as shown in FIG. 3C, the first external electrode 141 and the second external electrode 142 may extend along the sides of the color change module 100 so as to be connected to the lower electrode 122 and the upper electrode 124 respectively. The first and the second external electrode 141 and 142 may connected to the lower electrode 122 and the upper electrode 124 of the reflective display 120 respectively, along the sides of the color change module 100 in the direction of the fingernail origin part M. In the case of forming the via holes to connect the first and the second external electrode 141 and 142 to the lower electrode 122 and the upper electrode 124 respectively, the via hole needs to be formed to penetrate the lower electrode 122 and the cell 123 so as to connect the second external electrode 142 to the upper electrode 124. Therefore, the cell 123 is not present in the portion in which the via hole is positioned, may resulting a problem that a color is not displayed. In the case of forming the first and the second external electrode 141 and 142 along the edge side of the color change module 100 to be connected to the lower electrode 122 and the upper electrode 124 respectively, a via hole is not required, so the cell 123 is able to be formed in an area as large as possible and formed more simply than that in the process of forming the via holes. In the case of forming the first and the second external electrode 141 and 142 at the edge side of the color change module 100, a reinforcement layer 150 for protecting the external electrode 140 may be formed at the edge side of the color change module 100.

Referring back to FIG. 3A, the external electrode 140 needs to be exposed to outside to be connected to the color change control apparatus 200. Since the upper surface of the color change module 100 that is applied to an artificial nail is visible to outside, it is bad in terms of aesthetics that the external electrode 140 is exposed to the upper surface of the color change module 100. When the color change module 100 is attached to a person's fingernail, a part of the lower surface of the color change module 100 that covers the fingernail is made invisible by the fingernail and the remaining part of the lower surface of the color change module 100 that does not cover the fingernail in the direction of the fingernail distal part N is exposed to outside. Therefore, according to an embodiment of the present disclosure, the external electrode 140 of the color change module 100 that is applied to an artificial nail is positioned in the lower surface of the color change module 100 (that is, the lower surface of the module base 110) and is formed to be exposed to outside under the fingernail distal part N.

However, sizes and lengths of fingernails differ between individuals, and lengths of artificial nails need to be adjusted to be different according to individual tastes. Therefore, the distal part N of the color change module 100 that is applied to an artificial nail needs to be provided with the external electrode 140 that is capable of being connected with the color change control apparatus 200 although the distal part N of the color change module 100 is partially removed to adjust the length. Therefore, according to an embodiment of the present disclosure, the external electrode 140 of the color change module 100 is formed to be long from the fingernail origin part M to the fingernail distal part N, so that although the distal part N of the color change module 100 is partially removed, the external electrode 140 still remains at the distal end of the color change module 100. Specifically, the first external electrode 141 and the second external electrode 142 are formed to be spaced apart from each other in the lower surface of the module base 110 of the color change module 100, and may be formed to extend long from the fingernail origin part M to the fingernail distal part N.

Figure 4:
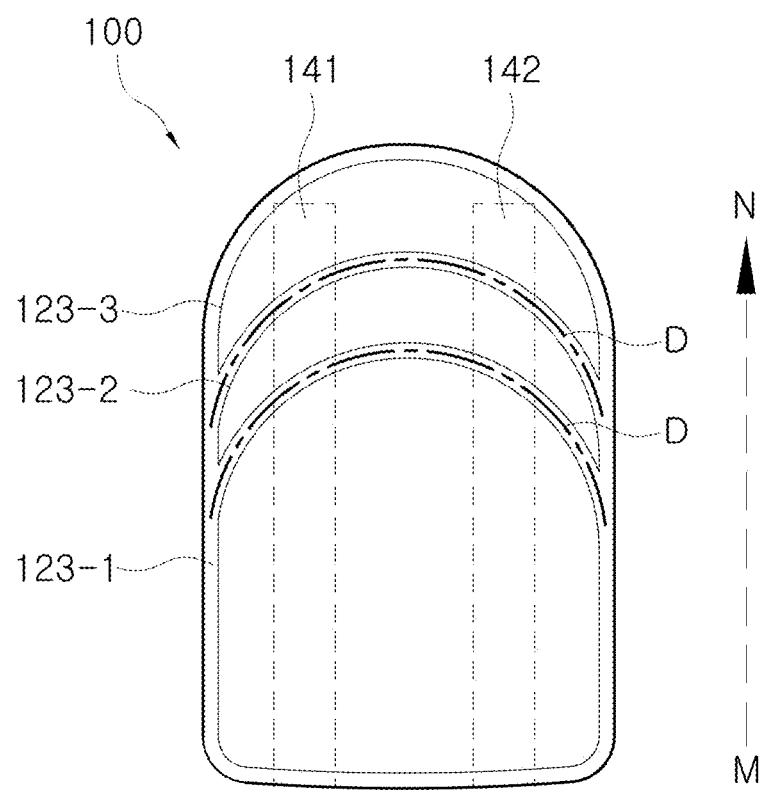
FIG. 4 is a diagram illustrating cutting lines of a color change module using a reflective display, which is applied to an artificial nail according to an embodiment of the present disclosure.

FIG. 4 is a diagram illustrating cutting lines D of a color change module 100 using a reflective display, which is applied to an artificial nail according to an embodiment of the present disclosure.

As shown in FIG. 4, the module base 110 of the color change apparatus may be formed in a shape corresponding to a person's fingernail. Cells 123 of the reflective display 120 may be formed in multiple sections respectively for cutting along cutting lines D that correspond to the curve of the fingernail distal part N. The first external electrode 141 and the second external electrode 142 may be formed in the lower surface of the module base 110 and formed to be parallel to each other and to be long in the direction from the fingernail origin part M to the fingernail distal part N.

In the color change apparatus, the cutting lines D may be present. The cutting lines D may be formed to correspond to the curve of the fingernail distal part N. The color change apparatus may be cut along the cutting lines D. The user may attach the color change apparatus to the fingernail and may partially remove the distal part N of the color change apparatus along the cutting lines D to adjust the length of the color change apparatus.

The cell 123 of the reflective display 120 may not be formed in a portion in which the cutting lines D are present. Since the cell 123 is not present in the cutting lines D, although the color change apparatus is cut along the cutting lines D, the cell 123 is prevented from being damaged and the fluid F and the particles P are thus not exposed to outside. That is, the cell 123 may be present only in an area between the cutting line D and the cutting line D.

The lower electrode 122 and the upper electrode 124 may be formed even in the portion in which the cutting lines D are present. That is, the lower electrode 122 and the upper electrode 124 are formed as single elements respectively over the entire surface of the reflective display 120, so that the same electric field may be provided to the multiple cells 123. Accordingly, even though the cells 123 are formed in a stand-alone manner between the multiple cutting lines D, all the cells 123 operate as one pixel.

In the color change module 100 applied to an artificial nail, one color change module 100 may operate as one pixel. For example, the color of the whole color change module 100 may be changed to green or red. Specifically, the lower electrode 122 and the upper electrode 124 of the reflective display 120 are formed to transmit the same electrical signal Sig to all the multiple cells 123. The first external electrode 141 connected to the lower electrode 122 and the second external electrode 142 connected to the upper electrode 124 are one each in number. When the electrical signal Sig is transmitted through the first external electrode 141 and the second external electrode 142, the color change module 100 operates as one pixel.

One color change module 100 may operate as one or more pixels. For example, a part of the color change module 100 may display a color different from another. Specifically, the lower electrode 122 and the upper electrode 124 of the reflective display 120 are divided into multiple sections (not shown) and are formed such that an electrical signal Sig is transmitted to only some of the multiple cells 123 corresponding to the respective sections. The first external electrode 141 connected to the lower electrode 122 in a particular section and the second external electrode 142 connected to the upper electrode 124 in the particular section are one each in number. There are a third and a fourth external electrode (not shown) connected to the lower electrode 122 and the upper electrode 124 respectively in another section. When different electrical signals Sig are transmitted to the first and the second external electrode 141 and 142 and to the third and the fourth external electrode (not shown), the color change module 100 operates as one or more pixels.

Figure 5:
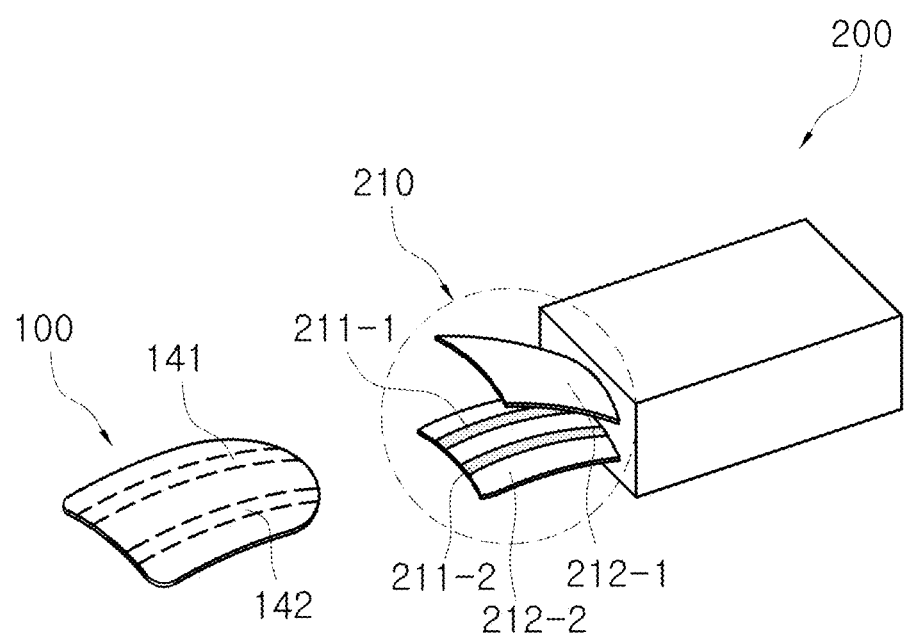
FIG. 5 is a diagram illustrating an independent type color change control apparatus for controlling a color of a color change module using a reflective display, which is applied to an artificial nail according to an embodiment of the present disclosure.
Figure 6:
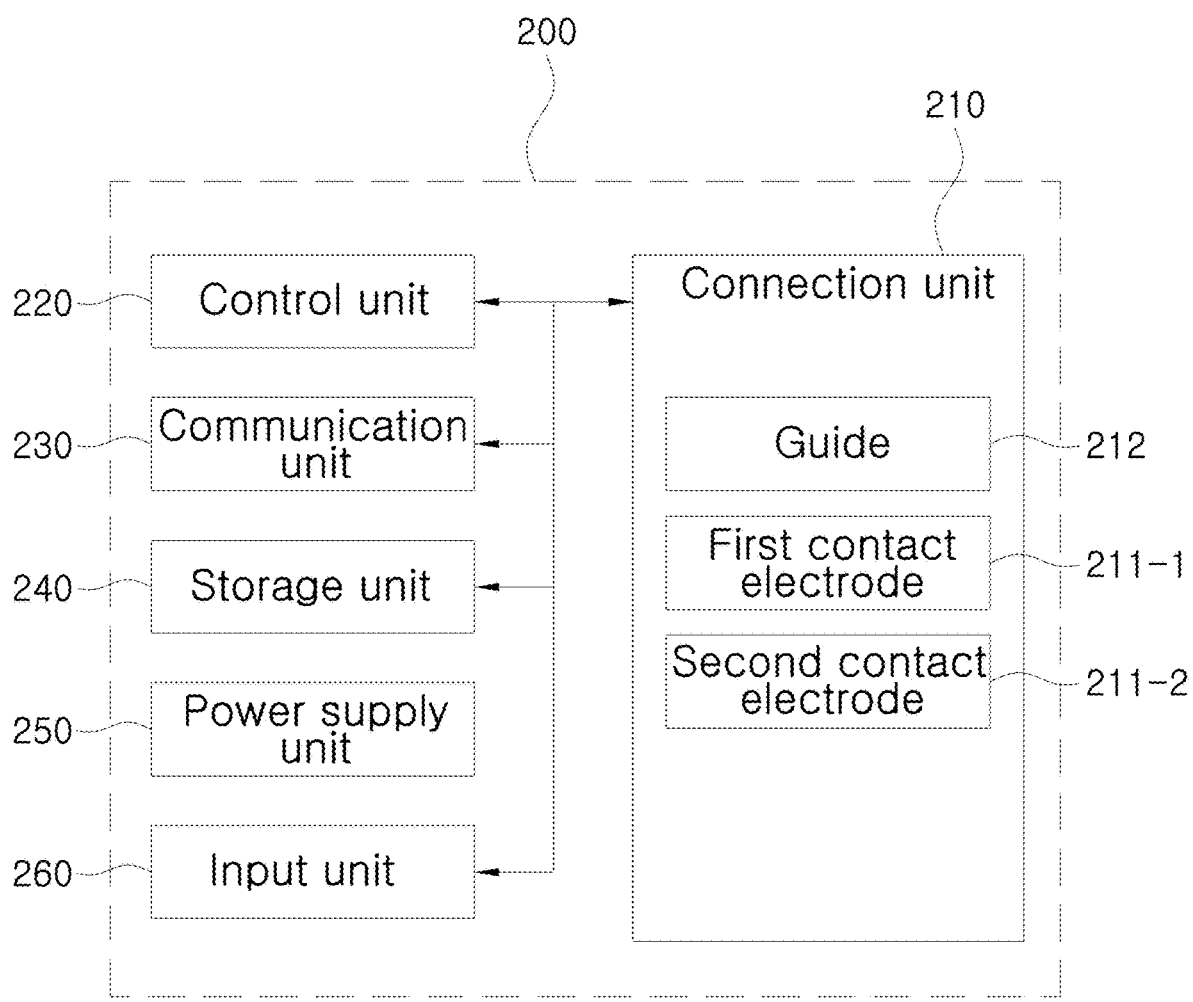
FIG. 6 is a block diagram illustrating a configuration of the independent type color change control apparatus according to the present disclosure.

FIG. 5 is a diagram illustrating an independent type color change control apparatus 200 for controlling a color of a color change module 100 using a reflective display, which is applied to an artificial nail according to an embodiment of the present disclosure. FIG. 6 is a block diagram illustrating a configuration of the independent type color change control apparatus 200 according to the present disclosure.

The independent type color change control apparatus 200 is an apparatus for controlling color change of the color change module 100 using the reflective display. The independent type color change control apparatus 200 may include a connection unit 210 and a control unit 220. The control unit 220 provides an electrical signal Sig required to change the color that the color change module 100 displays. The connection unit 210 is connected to the color change module 100 to transmit the electrical signal Sig to the external electrode of the color change module 100. In addition, the color change apparatus may further include a communication unit 230, a storage unit 240, and a power supply unit 250. The communication unit 230 is connected with a smartphone, a PC, a server, and other devices in a wired or wireless manner to transmit and receive data. The storage unit 240 stores information therein. The power supply unit 250 receives power from a battery or an external power source and supplies the power to the components of the color change control apparatus 200.

The control unit 220 includes a processor and generates an electrical signal Sig to transmit to the color change module 100 through the connection unit 210. The control unit 220 may generate the waveform of an electrical signal Sig required to realize a color or pattern, on the color change module 100, which is received from a user's smartphone, PC, server, etc. through the communication unit 230 or may read an electrical signal Sig corresponding to a color or pattern stored in the storage unit 240. Next, the control unit 220 may transmit the electrical signal Sig to the connection unit 210.

The connection unit 210 may connect the color change module 100 with the color change control apparatus 200. The connection unit 210 may have various structures for physical contact or electrical connection between the external electrode 140 of the color change module 100 and a contact electrode 211 of the color change control apparatus 200. The connection unit 210 of the color change control apparatus 200 used for the color change module 100 that is applied to an artificial nail may include a first contact electrode 211-1 of the contact electrode 211, a second contact electrode 211-2 of the contact electrode 211, and a guide 212. The first contact electrode 211-1 is in contact with the first external electrode 141 in order to transmit the electrical signal Sig from the control unit 220. The second contact electrode 211-2 is in contact with the second external electrode 142 in order to transmit the electrical signal Sig from the control unit 220. The guide 212 makes the first contact electrode 211-1 and the second contact electrode 211-2 to be in physical contact with the first external electrode 141 and the second external electrode 142 respectively.

The guide 212 is formed to correspond to the shape of a person's fingernail, and may include a lower guide 212-2 and an upper guide 212-1. The lower guide 212-2 has its upper surface in which the first contact electrode 211-1 and the second contact electrode 211-2 are formed. The upper guide 212-1 is formed to correspond to the shape of the lower guide 212-2, and applies pressure to the color change module 100 in the direction of the lower guide 212-2 for physical contact between the first external electrode 141 and the first contact electrode 211-1, second external electrode 142 and the second contact electrode 211-2.

The first contact electrode 211-1 and the second contact electrode 211-2 may be formed in the upper surface of the lower guide 212-2. The first contact electrode 211-1 and the second contact electrode 211-2 may be formed to be spaced apart from each other toward a distal part N of the lower guide 212-2 and to be parallel to each other. The first contact electrode 211-1 and the second contact electrode 211-2 may be formed to correspond to the positions of the first external electrode 141 and the second external electrode 142 of the color change module 100 respectively. The first contact electrode 211-1 and the second contact electrode 211-2 may transmit the electrical signal Sig received from the control unit 220 to the first external electrode 141 and the second external electrode 142 of the color change module 100. The number of the contact electrodes 211 may correspond to the number of the external electrodes 140 of the color change module 100.

The lower guide 212-2 and the upper guide 212-1 apply pressure to the distal part N of the color change module 100 from upper and lower sides like tongs, thereby connecting the color change module 100 and the color change control apparatus 200. The contact electrode 211 formed in the upper surface of the lower guide 212-2 comes into physical contact with the external electrode 140 formed in the lower surface of the color change module 100, so that the electrical signal Sig is transmitted from the color change control apparatus 200 to the color change module 100 through the contact electrode 211 and the external electrode 140. The guide 212 may be formed to be convex upward so as to correspond to the shape of the color change module 100. The degree of convexity of the guide 212 may be similar to the degree of upward convexity of a person's fingernail.

The user may use a smartphone, a PC, or the like to choose a color or pattern to be displayed on the color change module 100 and the chosen color or pattern may be transmitted through the communication unit 230 of the color change control apparatus 200. Alternatively, the user may use an input unit 260, such as a touch screen, etc., included in the color change control apparatus 200 to choose a color or pattern to be displayed on the color change module 100 from among colors or patterns stored in the storage unit 240.

According to an embodiment of the present disclosure, the color change module 100 that is applied to an artificial nail may not include the power supply unit 250 such as a battery, a coil, etc. and a semiconductor chip or control circuit for controlling the color change process, so that the color change module 100 itself may be manufactured to be thin and small and provided at a low price.

Figure 7A:
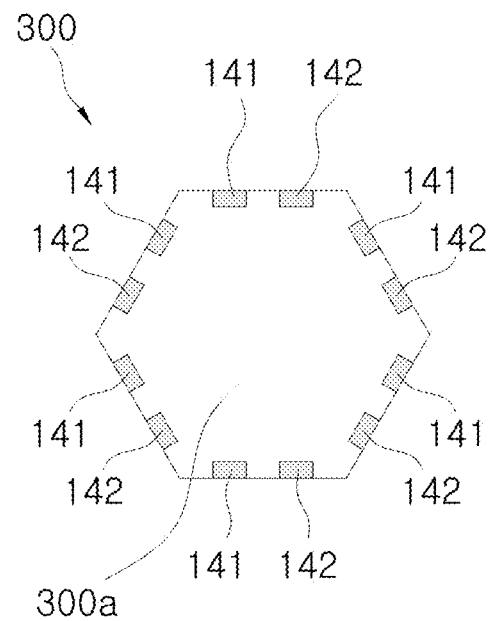
FIGS. 7A and 7B are diagrams illustrating a color change module using a reflective display, which is applied to interior tiles according to an embodiment of the present disclosure.
Figure 7B:
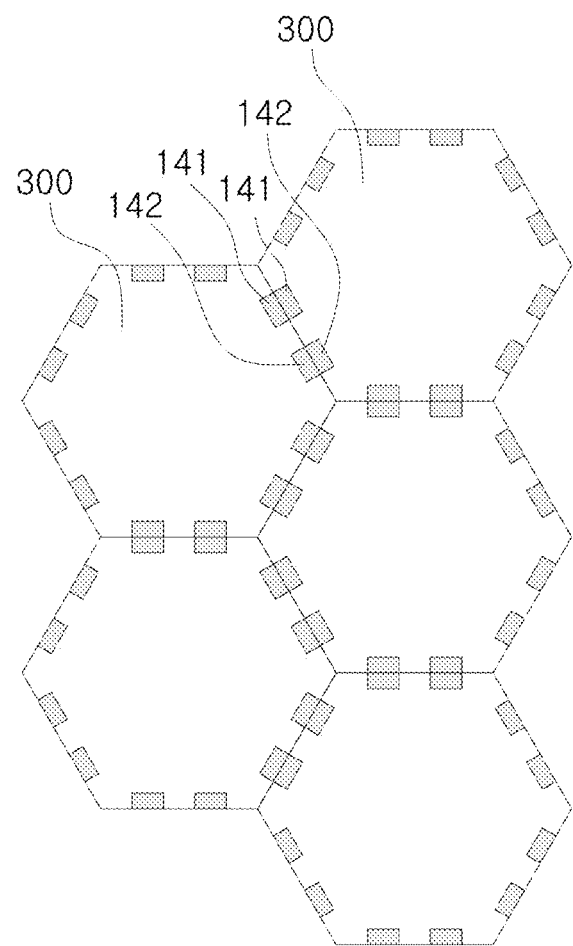

FIGS. 7A and 7B are diagrams illustrating a color change module 300 using a reflective display, which is applied to interior tiles according to an embodiment of the present disclosure. FIG. 7A is a diagram illustrating one color change module 300 and FIG. 7B is a diagram illustrating a situation in which multiple color change modules 300 are connected.

According to an embodiment of the present disclosure, the color change module 300 that is applied to an interior tile has substantially the same structure as the color change module 100 that is applied to an artificial nail, so only differences will be described. The color change module 300 that is applied to an interior tile may be made of a flexible material so as to be attached to furniture or a wall surface. The module base 110 of the color change module 300 that is applied to an interior tile may be formed in a pattern that completely fills a 2D plane. A first external electrode 141 and a second external electrode 142 may be formed to be exposed to the protective layer 125 of the reflective display 120, and may be formed to be in contact with a first external electrode 141 and a second external electrode 142 of a color change module 300 positioned nearby, respectively.

A color change module 300 may have a shape according to a tessellation method that completely covers a 2D plane without gaps or overlaps by using multiple color change modules 300 having one or more planar shapes. As shown in FIG. 7B, the color change module 300 may be formed in a hexagonal shape in which one pattern is repeated and covers a 2D plane, or may be formed in a square or triangle shape. Alternatively, the color change module 300 may be formed in a shape that is non-periodic like a Penrose tiling and covers a 2D plane using two or more tiles.

The first external electrode 141 and the second external electrode 142 of the color change module 300 that is applied to an interior tile may be formed to be in contact with a first external electrode 141 and a second external electrode 142 of a color change module 300 positioned nearby, respectively. In addition, the first external electrode 141 and the second external electrode 142 may be formed to be exposed or not to be exposed to the protective layer 125 of the reflective display 120.

For covering a wide surface using an interior tile, multiple interior tiles are required. It is inconvenient to change the color of the interior tiles individually. According to an embodiment of the present disclosure, the external electrode 140 of the color change module 300 that is applied to an interior tile is formed to be in contact with an external electrode 140 of a color change module 300 positioned nearby, so that by applying an electrical signal Sig for color change to any one of the interior tiles, the color of all the interior tiles connected through the external electrodes 140 is changed.

Although the embodiments of the present disclosure have been disclosed for illustrative purposes, it will be appreciated that the present disclosure is not limited thereto, and those skilled in the art will appreciate that various modifications, additions and substitutions are possible, without departing from the scope and spirit of the present disclosure.

Further, simple changes and modifications of the present disclosure are appreciated as included in the scope and spirit of the present disclosure, and the protection scope of the present disclosure will be defined by the claims.

What is claimed is:

1. A color change module using a reflective display, the color change module comprising:
   a module base having a shape corresponding to a shape of an object over which the color change module is to be attached;
   the reflective display provided over an upper surface of the module base, and configured to display information in a manner wherein light coming from outside is reflected, the reflective display comprising:
   a lower electrode layer,
   a reflective display layer disposed over the lower electrode layer and comprising one or more cells each containing multiple particles that are charged with different polarities and differ in quantity of electric charge or in size, the multiple particles comprising a plurality of first particles each having a positive electric charge and a plurality of second particles each having a negative charge,
an upper electrode layer disposed over the reflective display layer; and
a first external electrode and a second external electrode provided to be connected to the reflective display and to be exposed to outside, the first external electrode and the second external electrode being configured to receive electrical signals from an external apparatus, the first external electrode and the second external electrode being connected to the lower electrode layer and the upper electrode layer, respectively, to transmit the electrical signals so as to change color of the reflective display,
wherein the reflective display layer of the reflective display is divided into multiple sections each comprising one of the one or more cells, each of which contains the multiple particles such that when different electric signals are applied to the multiple sections, the multiple sections display different colors.

2. The color change module of claim 1, further comprising:
a decorative layer provided on the reflective display, and including at least one of a color, a design, a character, glitter, cubic zirconia, a jewel, or gloss.

3. The color change module of claim 1, wherein the reflective display further comprises:
a base substrate made of a flexible material, the lower electrode layer being disposed over the base substrate; and
a protective layer provided over the upper electrode layer and made of a transparent material.

4. The color change module of claim 3, wherein the module base is provided in the shape corresponding to a person's fingernail,
wherein the multiple sections are divided with cutting lines for cutting along the cutting lines that correspond to a curve of a fingernail distal part, and
wherein the first external electrode and the second external electrode are provided in a lower surface of the module base, and are provided to be parallel to each other and to be long in a direction from a fingernail origin part to the fingernail distal part.

5. The color change module of claim 1, wherein the module base is provided in the shape corresponding to a person's fingernail, and
the first external electrode and the second external electrode are provided in a lower surface of the module base, and are provided to be parallel to each other and to be long in a direction from a fingernail origin part to a fingernail distal part.

6. The color change module of claim 5, wherein the first external electrode and the second external electrode are connected to the lower electrode layer and the upper electrode layer through vias, respectively, and wherein the vias are located adjacent to a finger nail origin part.

7. A color change device comprising an array of the color change modules of claim 1 that are coupled to each other and are arranged on a 2D plane,
wherein the first external electrode and the second external electrode of a first one of the color change modules are provided to be in contact with the first external electrode and the second external electrode of a second one of the color change modules positioned nearby, respectively.

8. The color change device of claim 7, wherein the first external electrode and the second external electrode are provided not to be exposed to a protective layer of the reflective display.

9. The color change device of claim 7, wherein the first external electrode and the second external electrode are provided to be exposed to a protective layer of the reflective display.

10. An independent type color change control apparatus for controlling color change of the color change module of claim 1, the independent type color change control apparatus comprising:
a control unit configured to provide an electrical signal required to change a color that the color change module displays; and
a connection unit connected to the color change module to transmit the electrical signal to the first external electrode and the second external electrode of the color change module,
wherein the control unit is configured to transmit different electrical signals to the color change module such that the different sections of the color change module display different colors.

11. The independent type color change control apparatus of claim 10, wherein the connection unit comprises:
a first contact electrode being in contact with the first external electrode to transmit the electrical signal from the control unit;
a second contact electrode being in contact with the second external electrode to transmit the electrical signal from the control unit; and
a guide configured to make the first contact electrode and the second contact electrode in physical contact with the first external electrode and the second external electrode respectively.

12. The independent type color change control apparatus of claim 11, wherein the guide comprises:
a lower guide provided to correspond to a shape of a user's fingernail, and provided with an upper surface in which the first contact electrode and the second contact electrode are provided; and
an upper guide provided to correspond to a shape of the lower guide, and configured to apply pressure to the color change module in a direction of the lower guide for physical contact between the first and the second external electrode and the first and the second contact electrode.

13. The color change module of claim 1, further comprising a third external electrode and a fourth external electrode,
wherein the first external electrode and the second external electrode are connected to a first one of the plurality of sections, and the third external electrode and the fourth external electrode are connected to a second one of the plurality of sections such that different electrical signals are transmitted to the first section and the second section to display different colors.

* * * * *